(12) United States Patent
Trotter

(10) Patent No.: US 6,907,437 B1
(45) Date of Patent: Jun. 14, 2005

(54) MEMORY MANAGEMENT USING OBJECT POINTER STRUCTURE

(75) Inventor: Martin John Trotter, Romsey (GB)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/338,045

(22) Filed: Jun. 22, 1999

(30) Foreign Application Priority Data

Dec. 30, 1998 (GB) ............................................. 9828750

(51) Int. Cl.[7] ............................................. G06F 17/30
(52) U.S. Cl. ..................... 707/206; 707/10; 707/103; 707/204; 707/205
(58) Field of Search ............................... 707/206, 101, 707/103, 104, 10, 204, 205

(56) References Cited

U.S. PATENT DOCUMENTS

| | | | | |
|---|---|---|---|---|
| 5,845,298 A | * | 12/1998 | O'Connor et al. | 707/206 |
| 5,848,423 A | * | 12/1998 | Ebrahim et al. | 707/206 |
| 5,873,105 A | * | 2/1999 | Tremblay et al. | 707/206 |
| 5,903,900 A | * | 5/1999 | Knippel et al. | 707/206 |
| 5,915,255 A | * | 6/1999 | Schwartz et al. | 707/206 |
| 5,920,876 A | * | 7/1999 | Ungar et al. | 707/206 |
| 6,049,810 A | * | 4/2000 | Schwartz et al. | 707/206 |
| 6,098,080 A | * | 8/2000 | Endicott et al. | 707/206 |
| 6,115,782 A | * | 9/2000 | Wolczko et al. | 711/100 |
| 6,253,215 B1 | * | 6/2001 | Agesen et al. | 707/206 |
| 6,314,436 B1 | * | 11/2001 | Houldsworth | 707/206 |
| 6,434,576 B1 | * | 8/2002 | Garthwaite | 707/206 |

FOREIGN PATENT DOCUMENTS

| | | | |
|---|---|---|---|
| EP | 0 574 884 | 12/1993 | G06F/12/02 |
| EP | 0 874 309 | 10/1998 | G06F/9/44 |
| EP | 0 874 316 | 10/1998 | G06F/12/02 |
| EP | 0 911 726 | 4/1999 | G06F/9/40 |
| GB | 2 012 084 | 7/1979 | G06F/13/06 |

OTHER PUBLICATIONS

Wilson, "Uniprocessor Garbage Collection Techniques", ACM, 1992, pp. 1–67.*

* cited by examiner

Primary Examiner—Thuy N. Pardo
(74) Attorney, Agent, or Firm—Richard M. Ludwin, Esq.; McGinn & Gibb, PLLC

(57) ABSTRACT

There is described a method of accurately scanning the C stack. One technique for solving these problems is to indirectly reference objects using handles however the some JVMs have removed handles to gain a performance improvement. The embodiment describes a solution in which 32 bit quantities are known to be object references by means of some side information. This avoids the problem of integer values masquerading as references causing objects to be needlessly retained. It also allows employment of a compacting collector which is allowed to move objects even if they are referenced from the stacks. Currently the compactor is prevented from moving such objects leading to reduced compaction efficiency.

7 Claims, 5 Drawing Sheets

MEMORY MANAGEMENT USING OBJECT POINTER STRUCTURE

FIELD OF INVENTION

This invention relates to memory management and in particular to registering of object references within a memory management system.

BACKGROUND OF INVENTION

The Java programming language has its origins in a project undertaken by Sun Microsystems to develop a robust programming environment that would meet the technical challenges of the consumer device software environment. The original consumer device projects were eventually abandoned but the Java programming language found itself being used on the World Wide Web to enable cross platform operation of programs downloaded from the internet. It is simple to use having similar features to C++ such as the basic object orientated technology but without some of the more complex features.

Typically, Java applications (source code) are compiled by the Javac compiler into Java byte code (intermediary code or pseudo object code) which can be loaded and executed by a Java Virtual Machine (JVM) (see FIG. 1). The JVM provides an instruction set, memory management and program loading capability that is independent of the hardware platform on which it has been implemented. The Java application source code is compiled into architecture independent byte code and the byte code is interpreted by a JVM on the target platform. Java is designed to be portable and follows some defined portability standards, which intend the source code to be "write once, run anywhere". The Java byte code may be further compiled into machine code (object code) for the target platform at which point the architectural independent nature of Java is lost.

The JVM is a software computing machine, effectively it simulates a hardware machine that processes Java byte code. The byte code is interpreted and processed by a JVM such as an Windows JVM running on a Intel personal computer platform. The JVM includes components for loading class files, interpreting the byte code, garbage collecting redundant objects, and for managing multiple processing threads. The JVM may also include a Just-In-Time compiler to transform some or all the byte code into native machine code.

Garbage collection is the term used for describing how program objects are discarded by the system after they have been loaded into memory and after they are no longer useful. Memory space in object oriented environments is at a premium due to the memory intensive nature of object orientated programs. For further information on garbage collection see Chapter 1 of 'Garbage Collection' by H Jones & R Lins, Wiley. Chapter 4 deals with Mark & Sweep techniques.

Many current implementations of Java use the classic mark-sweep-compact method of garbage collection as delivered in the base SUN JVM. References to the objects that are being processed at any instant by the system are stored in one or more thread stacks and some global variables. The totality of objects that are needed by the system can be found by tracing through the objects referenced in the stacks looking for references to new objects, tracing the global variables and then tracing through these "root" objects for further references. The objects in use by a system thereby form a graph and any extraneous objects are not part of this graph. Once all the objects in the graph are found, the remaining objects in the heaps may be discarded (garbage collected).

The traditional mark and sweep garbage collection method is described below in terms of pseudo code with respect to a single heap:
  Stop all threads
  Trace all stacks for object references—the local roots
  Trace all classes for object references—the global roots
  Trace through root set for references until no new object references (the sum of the local and global roots is the root set).
  Delete all objects in the single heap that are not referenced.

One of the problems in garbage collecting is tracing a stack for object references when the stack is a mixture of variables including pointers to objects, floating pointer numbers and integer numbers. An accurate scan determines the object pointers exactly whereas a conservative scan determines which words are not object pointers and which maybe. The conservative scan is not exact but it uses less resources than those needed for an accurate scan.

A conservative scan (see FIG. 4) retrieves the stack pointer (step 4.1) and then retrieves the word in the stack indicated by the pointer (step 4.2). A first test is applied, if the word is an object pointer is it pointing in the correct part of the memory, typically this will be between certain limits (step 4.3). If the tested word points outside the limits then it is not an object pointer (4.4). A further test is applied (step 4.5) to check whether the word points to the normal object boundary in the heap? Typically the boundaries in the heap will be multiple number of bytes such as 8-although there may be several sizes of object grouping say small 8 bytes, medium 64 bytes and large 4096 byte boundary. The word if it is a pointer will point to one of these boundaries and the word is added to the root set step 4.6). If the word does not so point then it is not an object pointer (4.5). If the scan is finished (step 4.7) then the conservative root set has been acquired (4.9). If the scan is not so finished then the stack pointer is incremented and the cycled started again by acquiring the stack word (step 4.2). The root set acquired in this conservative scan is therefore a larger set of words than exist actual object pointers. Furthermore when stack space is created previously existing stack pointers are not immediately overwritten and infiltrate the conservatively scanned root set.

Garbage collection is performed on all the objects in the heap minus the root set and therefore not all the objects that should be are collected. Moreover, since some of the words in the root set are not object pointers, it is fatal to treat them as object pointers for the purposes of updating them when an object is moved. Therefore compaction of objects in a conservatively scanned root set is not desirable.

Accurate scanning has been achieved on the J stack. Techniques exist to find object references in the Java stack which rely on abstract interpretation of the Java code to discover the current stack map at a given set of designated 'safe points'. When execution reaches such a safe point we can do garbage collection in the knowledge that we have a complete map of the where the references are and can update them. A map is stored for each safe point. The map identifies each word in the stack at that point in the process. For a large number of safe points there will be a large number of maps and a high memory usage. A 'safe point' is a point where garbage collection may safely be carried out when there is no object reference both in the stack and in the a register. If this were the case then updating the object reference in the stack during a compaction would not leave a discrepancy between the register pointer and the stack pointer and cause a serious error, possibly a system crash. The Java stack in the JVM holds the variables created and used by the Java application.

The C stack holds the variables created and used by the virtual machine when it interprets the Java application. There is a problem with accurate scanning for garbage collection in the C stack as some object pointers are processed in registers but not placed in the C stack and hence should be in the root set. Most JVM's are compiled from C by a compiler which leaves object pointers in registers as long as possible to improve speed. The disadvantage of this speed optimisation is that many objects are hidden in registers (up to 32) not on the stack and cannot be scanned.

An advantage of the present invention is that the new reference structure forces a C compiler to update the C stack—empty the registers at safe points.

SUMMARY OF INVENTION

According to one aspect of the invention, there is provided a method of retrieving object references in a stack comprising: retrieving an object data structure from the stack; extracting an object reference from one part of the data structure; and extracting a reference to the next data structure in the stack from another part of the data structure.

According to a second aspect there is provided a method of managing a object in a stack based process comprising: storing an object data structure in the stack comprising a reference to the object and a reference to a previously stored object data structure in the stack.

The current JVM does a conservative scan of the C stack to find 32 bit values which may be references to objects. What is required is a method of accurately scanning the C stack. One technique for solving these problems is to indirectly reference objects using handles; however the some JVMs have removed handles to gain a performance improvement. The embodiment describes a solution in which 32 bit quantities are known to be object references by means of some side information. This avoids the problem of integer values masquerading as references causing objects to be needlessly retained. It also allows employment of a compacting collector which is allowed to move objects even if they are referenced from the stacks. Currently the compactor is prevented from moving such objects leading to reduced compaction efficiency.

There are well known techniques for finding references in the java stack which rely on abstract interpretation of the Java code to discover the current stack map at a given set of designated 'safe-points'.

When execution reaches such a safe point garbage collection can be performed in the knowledge of a complete map of where the references are and how they can be updated.

The problem comes with C stacks and locating all local variables which reference objects and which potentially need to updated. Ideally the C compiler would produce stack maps at safe points but this would clearly be a complex organisational task and use large amounts of resource. The advantage of this proposal offers an alternative, very lightweight and compiler independent solution to the problem. All references (typically JHandle* types) are advantageously replaced by a new type, e.g.

```
struct obj_ref {
  Jhandle* ref;
  struct obj_ref* next;
};
```

The JVM code is searched to find these JHandle* variables and they are turned into struct obj_ref variables. Usages of those variables then need to be modified hence o=&xyz becomes o.ref=&xyz, a simple modification which causes no runtime performance overhead. To make the variable (called o) visible to the outside world (in particular the garbage collector), a variable "struct obj_ref* head" is defined in the sys_thread structure and assigned a NULL value on thread creation. Thereafter on entry to each function (or inner block) which declares a struct obj_ref (executejava is a concrete example which defines "o" which would turn into one of these) the struct obj_ref needs to be linked into the list building on "head". Thus the following:

save_head=head; // remember the head on entry so we can restore on exit original.next=head; // link the reference to the next in the chain (lower in the C stack, at a higher address).

head=&original; // this reference is now the head of the chain

On exit from the routine the struct obj_ref is unlinked from the chain by restoring the save_head value into head.

If a JHandle* is passed as a parameter to another routine there are two options. A reference to the obj_ref can be passed and then the ref field copied into a local obj_ref which has already been registered in the callee. Alternatively an indirect reference ref can be made from the callee. This latter is similar to introducing a local handle to the object and makes sense when the number of references to the object is small. Therefore it can be decided on a case by case basis which option is the more efficient. As implied by the above on exit from any function continuing a registered obj_ref, the head must be restored to the above saved value.

The key advantage is that an external observer can discover ALL the referenced objects from the C stack by simply starting from head (visible in the sys_thread) and walking to the terminating NULL. At each point on the walk an obj_ref contains a reference to the next obj_ref. In the simplest case the object pointed to by "ref" can be pinned and in a more complex case the object can be moved to a new address and the reference updated to point at the new position.

BRIEF DESCRIPTION OF DRAWINGS

In order to promote a fuller understanding of this and other aspects of the present invention, an embodiment will now be described, by way of example only, with reference to the accompanying drawings in which.

DETAILED DESCRIPTION OF PREFERRED EMBODIMENT

Figure 1:
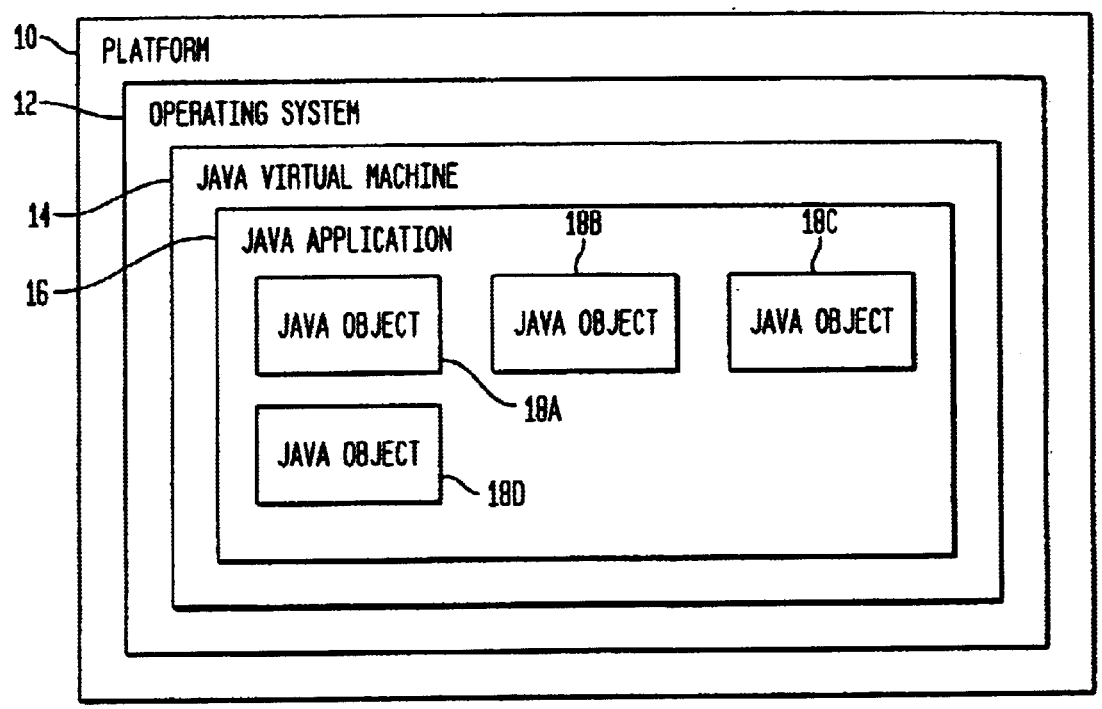
FIG. 1 is a schematic representation of a platform supporting the embodiment of the present invention.

Referring to FIG. 1 there is shown a computer platform 10 typically comprising: a motherboard with a pentium processor, 32 Mbytes RAM memory, and interface circuitry; 4 G Byte hard drive; 20×CD ROM; SVGA monitor; keyboard and mouse. On power on the platform loads into the memory an operating system 12 such as Windows NT v4 and subsequently a Java Virtual Machine (JVM) based on the Java Development Kit (JDK) v1.1 or v1.2. The Java virtual machine is capable of loading a Java application 16 from disk into memory so that the application may be executed on the platform. The Java application 16 is object orientated program code and creates Java language objects 18A, 18B, 18C, 18D.

Figure 2:
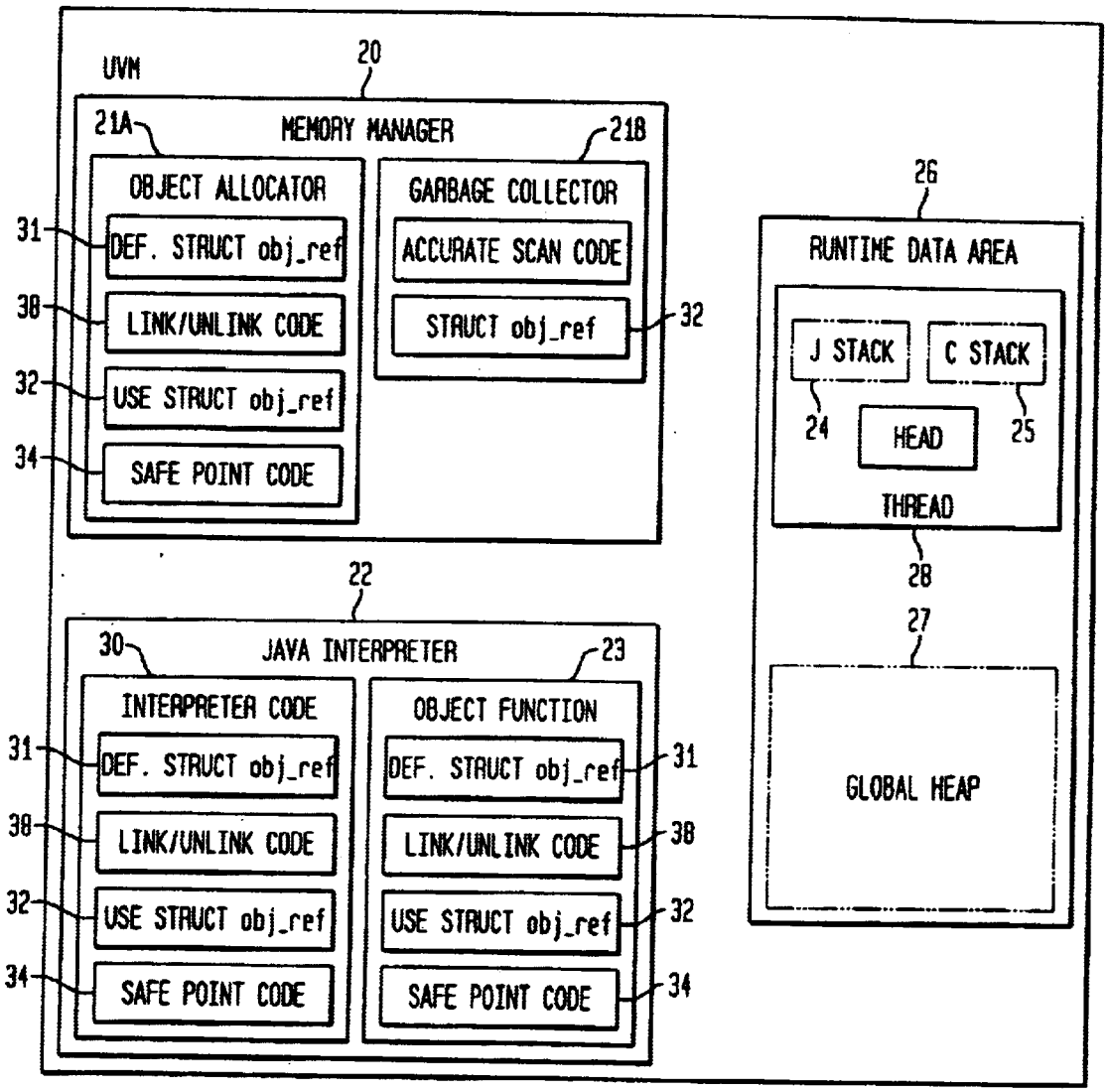
FIG. 2 is a schematic representation of a Java Virtual Machine embodying the invention.

The JVM 14 comprises code components for the multitude of tasks it has to perform (see FIG. 2). The components of relevance to the present embodiment comprise memory manager 20 and Java interpreter 22. In operation the JVM uses runtime data area 26, for storing the objects 18 and data for the application 16. The runtime data area 26 includes thread memory space 28 and global heap 34. The thread memory space 28 stores objects and execution data in a local heap (not shown) or a global heap 34.

Execution data including object references and register data are stored in the stacks of which there are two types: the J stack 30 and the C stack 31. The J stack 30 is used to store the Java application execution data when it is being processed by the JVM. The C stack 31 is used to store the JVM execution data when it is being processed by the platform. The JVM is a stack based processor and therefore all the Java application variables are placed in the stack at some point during processing. On the other hand most hardware platforms are register based processors and use a combination of stack and register storage when processing.

The memory manager 20 includes an object allocator 21A and a garbage collector 21B which between them control the creation and deletion of objects within the heap 34.

The Java interpreter 22 includes functionality to interpret (interpreter code 30) and process (object function code 23) the Java byte codes which make up the Java byte code function set. Although only one object function 23 is represented there are many such functions within the JVM.

The object allocator 21A, Interpreter Code 30 and object functions are typical code components in the JVM. Their relevance to the present embodiment is that they define and use object references. In the present embodiment each object reference definition is replaced by a structured object definition 31 and each use of a object reference is replaced by the use of a structured object reference 32. Additionally, each time a structured object is defined it is linked and later unlinked to the C stack 31 by link/unlink code 38. Furthermore to enable safe garbage collection during the operating of the JVM there is interspersed safe point code 34 throughout the object allocator 21A, interpreter code 30 and object functions 23.

A typical object function defines one or more object references and performs operations involving variables including the object references before returning to the calling function. For instance:

```
Void Javafunction ( ......) {
    define object reference O;
    O = &xyz;
    return
}
``` defines an object reference and sets it to point at the object xyz before returning to the function which called it.

The object function of the embodiment comprises: a structured object reference definition 31 instead of the object reference definition; a structured object reference 32 instead of a object reference; linking and unlinking code 38 for constructing and deconstructing a linked list of structured object references; and safe point code 38 for forcing register variables onto the stack. An example of an object function 23 of the embodiment in pseudo code similar is:

```
Void Javafunction' ( ......) {
    Define structured object reference O; 31
    Link (O) ; 38
    O.ref=xyz; 32
    if (need_to_be_safe)then call_external_GC( );  36
    unlink (O) ; 38
    Return
}
```

The object reference O has been replaced by a new type, a structured object reference O 31 having two fields: the first field being an object reference and the second field being a reference to the next structured object reference in the stack. An example of pseudo code for Def. struct obj_ref 31 is:

```
Struct obj_ref{
    Object reference*ref;
    Struct obj_ref*next;
}
```

Link (O) and unlink (O) 38 are instructions to connect and disconnect a structured object reference with the previously stored structured object. An example pseudo code for Link/unlink 38 the takes the form

| | |
|---|---|
| save_head=head | ;the variable head points to the stack and the variable save_head temporally saves this pointer for restoration later |
| O.next=head | ;sets the next field in O to the top of the stack |
| head=&O | ;&O indicates the address of object O |
| . | ;function is performed |
| . | |
| . | |
| head=save_head | |
| return | |

The top of the stack is represented by the head variable, this is saved on entry in the save_head variable so that it may be restored on exit. The structured data object has its next field set to point at the top of the stack so that the structured data is linked to the object reference next in the chain (lower in the C stack at a higher address). The head variable is then set to point at the new head of the chain in the C stack. Before exiting from the routine the references are unlinked from the chain by restoring the save_head value into head.

The use of struct obj_ref 32 is represented by the setting of the next field in the structured data object 'O.next=head' in the previous example. Ordinarily the object reference would not have additional fields and would be set simple by equating it with a variable like 'O=head'.

The safe point code 34 is denoted by the pseudo code 'if (need_to_be_safe) then call_external_GC( )'. The flag (need_to_be_safe) is set by one thread when waiting for other threads to finish so that garbage collection may be performed. When a thread encounters a safe point code, it checks the flag and makes the external call to the garbage collector to await the suspension of all other thread processing. Due to the external nature of the call it is necessary to consider the registers that may contain object references are placed in the stack.

Another thread could not simply stop another thread, change any of the refs and then expect that thread to resume safely; clearly there are many points during which there will be copies of object references in registers and those copies WILL be used after the copy on the stack has been changed. The C compiler which compiles the JVM from the C source code is unaware of this problem and will try to put many object references in registers for optimization purposes. Safe points can be forced at any point where the compiler makes an external call since the compiler has no way to predict the operations in the callee and the effect of those operations on the in-memory state. External in the sense that the callee is not visible at compilation time, ie in another compilation unit. Following such an external call the compiler will force all register copies of externally visible variables to be invalid and will reload from the stack/heap/statics etc. The only time it can avoid such a reload is when it can be absolutely sure that nobody else can have gained addressability to it and is thus unable to change it candidates are clearly variables of purely local scope. Variables of obj_ref type are marked externally visible by virtue of the assignment of their address to an externally visible variable. Hence we can at any point inject a safe point into existing code by something resembling the following:

```
if    (need_to_be_safe)    { // a flag which someone
                              sets to force some GC
                              action
call_external_GC( );       // some GC action which wants to
                              possible modify object
                              references and at this point the
                              compiler will reload its 'local'
                              variables
}
```

The big advantage of this is that it should have minimal impact on the performance and will enable exact compacting garbage collection. This in turn will improve the heap management and improve the performance of the JVM.

The garbage Collector 21B comprises accurate scan code 40 and may contain some structured object references 32. An accurate scan is described with reference to FIG. 5.

Figure 3:
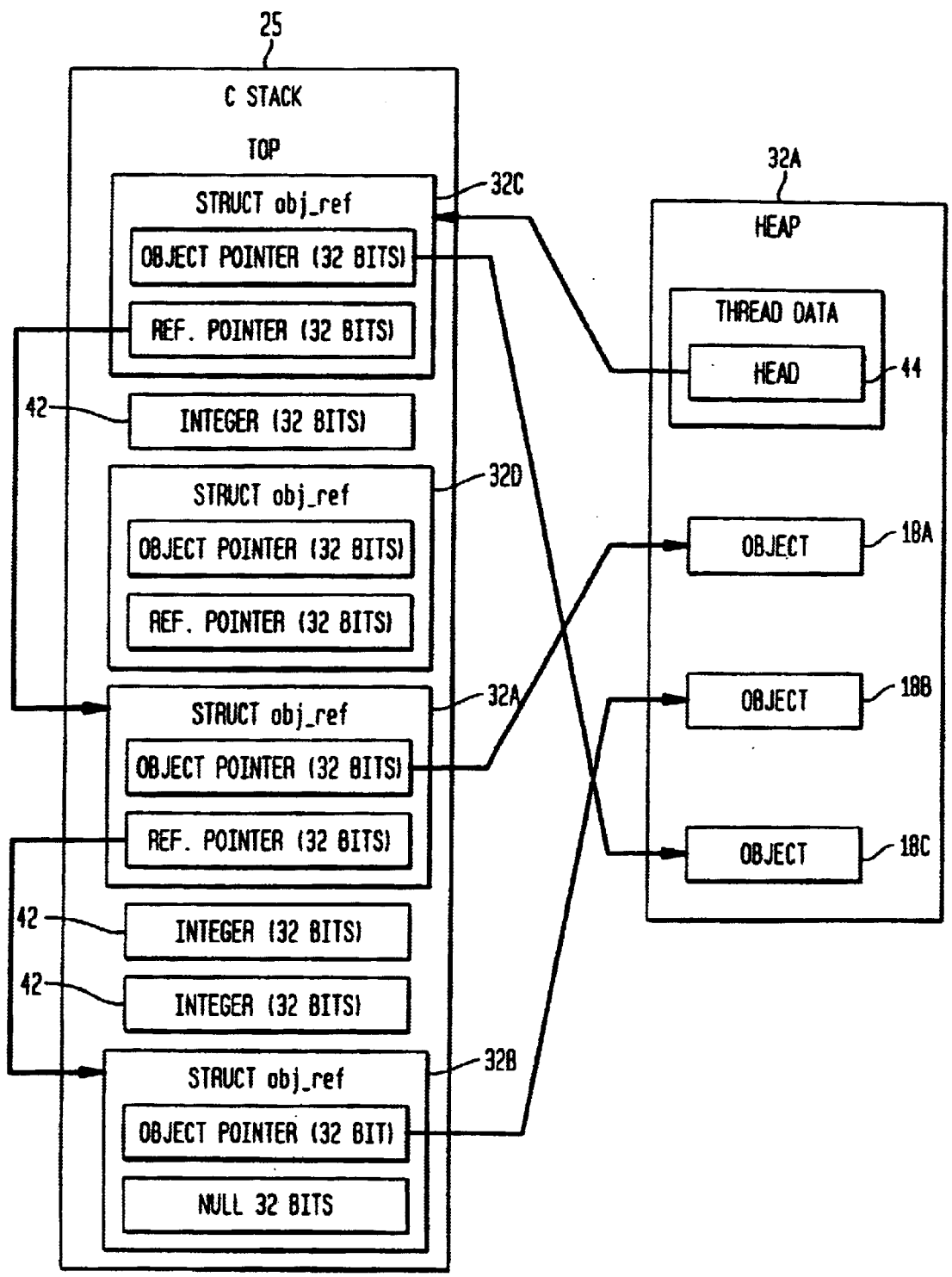
FIG. 3 is a schematic representation of an active C stack and heap of the JVM of the embodiment.

An active C stack 31 of the embodiment comprises a number of active structured object references 32A,B,C and one or more obsolete structured object references 32D (see FIG. 3). Each object pointer field of the structured object references 32A,B,C points to respect objects 18A;B,C in Heap 32A. The head variable 44, part of thread data, points to the structured object reference at the top of the C stack 31. The linked list comprises structured object reference 32C at the top, 32A in the middle and 32B at the bottom. The reference pointer field (next field) of structured object reference 32C points to structured object reference 32A. The reference pointer field (next. field) of structured object reference 32A points to structured object reference 32B. The reference pointer field (next field) of structured object reference 32B contains a null value indicating the end of the linked list.

Figure 4:
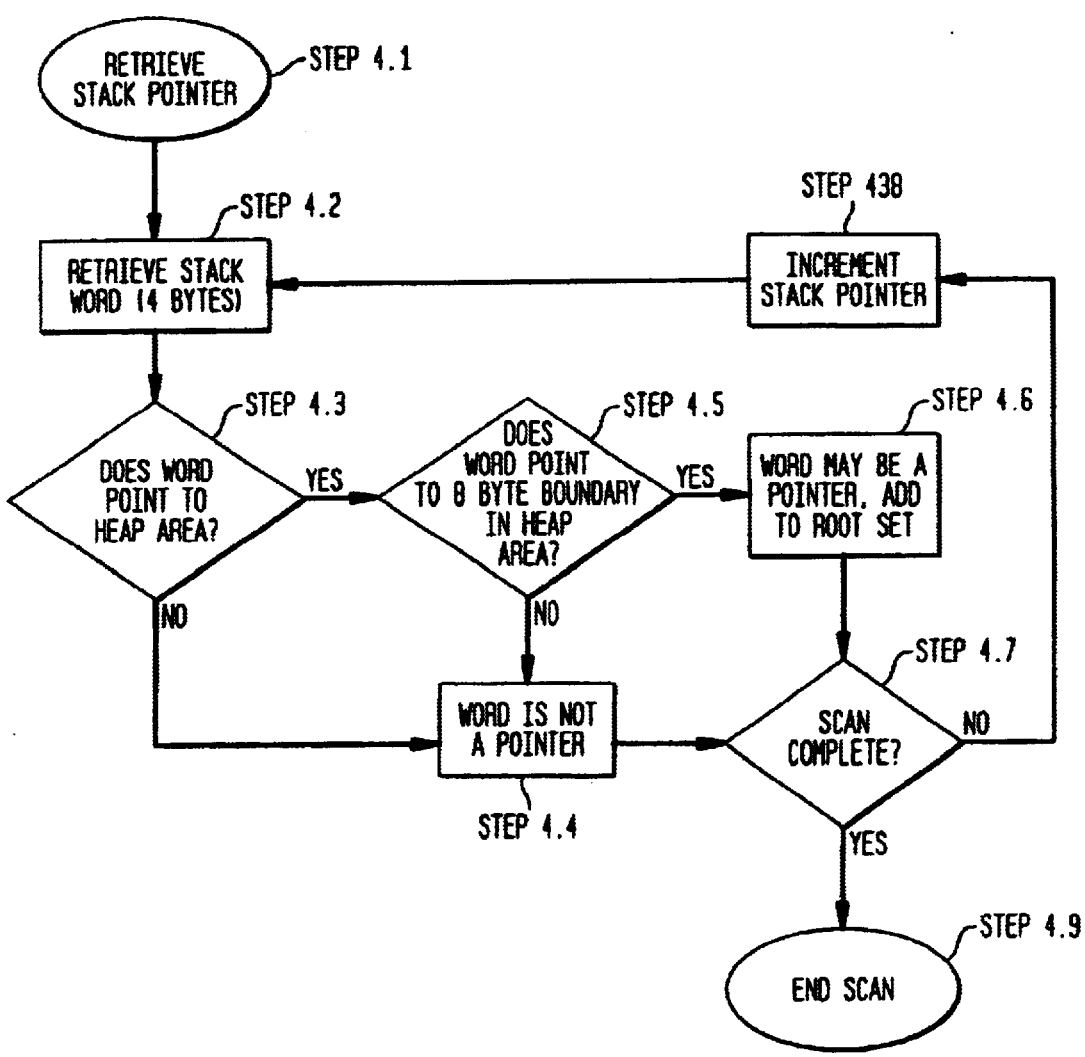
FIG. 4 shows the process of a conservative scan of the C stack according to the prior art.

The conservative scan depicted in FIG. 4 has been described in the introduction to the specification.

Figure 5:
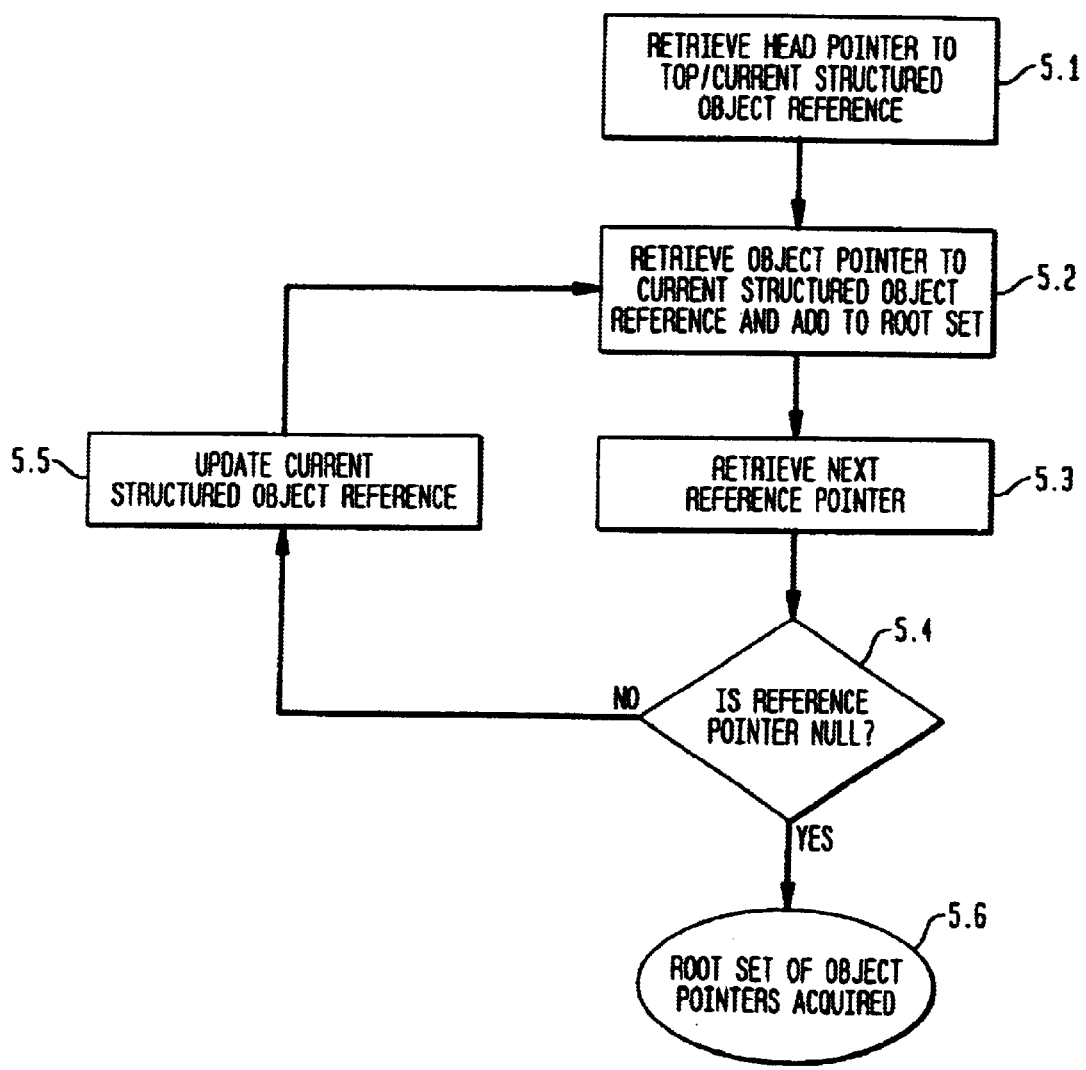
FIG. 5 shows the process of an accurate scan of the C stack according to the present embodiment.

An accurate scan of the C stack of the embodiment initially retrieves the head variable 44 which points at the structured object reference at the top of the stack (step 5.1)—this is made the current structured reference object (see FIG. 5). The object reference of the current structured object reference is acquired and added to the root set—step 5.2. The reference of the next structured object reference is acquired from the current structured object reference—step 5.3 and is examined for a null value which would indicate the last object reference in the list—step 5.4. If there is no null value the current structured object reference is updated to this next structured object reference—step 5.5 and the next object reference is added to the root set at step 5.2 where the process starts again. If there is a null value the accurate scan terminates with a complete root set of object pointers—step 5.6.

In summary there is described a method of accurately scanning the C stack. One technique for solving these problems is to indirectly reference objects using handles however the some JVMs have removed handles to gain a performance improvement. The embodiment describes a solution in which 32 bit quantities are known to be object references by means of some side information. This avoids the problem of integer values masquerading as references causing objects to be needlessly retained. It also allows employment of a compacting collector which is allowed to move objects even if they are referenced from the stacks. Currently the compactor is prevented from moving such objects leading to reduced compaction efficiency.

("Java" is a trademark of Sun Microsystems Inc.)

Now that the invention has been described by way of a preferred embodiment, various modifications and improvements will occur to those person skilled in the art. Therefore it should be understood that the preferred embodiment has been provided as an example and not as a limitation.

What is claimed is:

1. A method of managing an object in a thread stack based garbage collected virtual machine, said method comprising:

storing an object data structure in the thread stack comprising a reference to the object and a reference to a previously stored object data structure in the stack, whereby the object data structure and the previously stored object data structure form a root set of data object structures;

linking the object data structure to the previously stored object data structure;

storing a variable pointing to the previously stored object data structure at the top of the stack;

using the variable when storing a new object data structure; and updating the variable with the new object data structure reference.

2. A method as claimed in claim 1 further comprising:

saving the variable pointer;

storing the object data structure;

updating the variable with the reference to the latest stored object data structure;

performing the process; and restoring the stack pointer.

3. A method of garbage collecting memory, said memory having objects, said objects having object pointer structures references in a thread stack, said method comprising:

retrieving an object pointer structure from the thread stack;

extracting, from the object pointer structure, a reference to its corresponding object and a reference to a next object pointer structure in the thread stack;

performing said retrieving and said extracting with respect to a next, subsequent and last object pointer structures, whereby the retrieved object references identify a root set of objects within the memory; and reclaiming the memory not used by the root set of objects.

4. The method of claim 3, further comprising:

compacting the root set of objects so that they are contiguous in memory and updating all object pointers and references in the thread stack.

5. A method of garbage collecting memory, said memory having objects, said objects having an object reference within an object pointer structures references in a thread stack, said method comprising:

storing object pointer structures in the thread stack, each object pointer comprising a reference to an object and a reference to a subsequent object pointer structure in the thread stack such that the object pointer structures are a linked list;

identifying a root set of objects from the linked set of object pointer structures;

identifying all objects referenced directly or indirectly by the root set objects; and reclaiming the memory space not used by the identified objects.

6. The method of claim 5, further comprising:

storing a variable referencing to the last stored object pointer;

using the variable when storing a new object pointer; and updating the variable with the new object pointer reference.

7. The method of claim 5, further comprising:

compacting the identified set of objects so that they are contiguous and updating all object references in the stack.

* * * * *